(12) United States Patent
Souders

(10) Patent No.: US 11,070,608 B2
(45) Date of Patent: Jul. 20, 2021

(54) EXPEDITED SUB-RESOURCE LOADING

(71) Applicant: Fastly, Inc., San Francisco, CA (US)

(72) Inventor: Steven Souders, Los Altos, CA (US)

(73) Assignee: Fastly, Inc., San Francisco, CA (US)

( * ) Notice: Subject to any disclaimer, the term of this patent is extended or adjusted under 35 U.S.C. 154(b) by 419 days.

(21) Appl. No.: 14/741,631

(22) Filed: Jun. 17, 2015

(65) Prior Publication Data

US 2016/0373544 A1    Dec. 22, 2016

(51) Int. Cl.
*H04L 29/08* (2006.01)

(52) U.S. Cl.
CPC .......... *H04L 67/02* (2013.01); *H04L 67/2823* (2013.01); *H04L 67/2847* (2013.01); *H04L 67/34* (2013.01)

(58) Field of Classification Search
CPC ............................ H04L 67/2842; H04L 67/02
USPC ........................................................ 709/213
See application file for complete search history.

(56) References Cited

U.S. PATENT DOCUMENTS

| | | | | |
|---|---|---|---|---|
| 5,802,518 A | * | 9/1998 | Karaev | G06F 17/30448 |
| 6,026,474 A | * | 2/2000 | Carter | G06F 9/5016 |
| | | | | 707/999.01 |
| 6,029,175 A | * | 2/2000 | Chow | G06F 17/30899 |
| 6,038,601 A | * | 3/2000 | Lambert | G06F 17/30902 |
| | | | | 370/468 |
| 6,085,193 A | * | 7/2000 | Malkin | G06F 17/30902 |
| 6,098,064 A | * | 8/2000 | Pirolli | G06F 17/30902 |
| 6,098,074 A | | 8/2000 | Cannon et al. | |
| 6,144,991 A | * | 11/2000 | England | H04L 29/06 |
| | | | | 709/205 |
| 6,161,124 A | * | 12/2000 | Takagawa | H04L 29/06 |
| | | | | 707/E17.112 |
| 6,247,020 B1 | * | 6/2001 | Minard | G06F 8/34 |
| 6,266,709 B1 | * | 7/2001 | Gish | G06F 9/4443 |
| | | | | 714/E11.211 |

(Continued)

FOREIGN PATENT DOCUMENTS

| | | |
|---|---|---|
| CN | 101593207 A | 12/2009 |
| CN | 102681848 A | 9/2012 |
| CN | 104468817 A | 3/2015 |

OTHER PUBLICATIONS

Heilmann, "Beginning JavaScript with DOM Scripting and Ajax From Novice to Professional", 2006.*

(Continued)

*Primary Examiner* — Ondrej C Vostal

(57) ABSTRACT

Systems, methods, apparatus, and software for pre-fetching and/or pre-loading sub-resources used in rendering HTML files, web pages and the like are provided herein. Implementations include expedited sub-resource loading in which a cache node or other content delivery network component receives a first end user device request seeking a primary resource (e.g., an HTML file). Using information in the first request, the content delivery network pre-fetches one or more identified sub-resources (e.g., JavaScript code) required for rendering of the HTML file. Pre-fetched sub-resources are held by the cache node. During parsing of the HTML file by the end user device, a web browser or other application requires the sub-resource(s) and the end user device thus sends a second request to the cache node asking for the required sub-resource(s). The cache node sends the requested, pre-fetched sub-resource(s).

6 Claims, 12 Drawing Sheets

(56) References Cited

U.S. PATENT DOCUMENTS

| | | | |
|---|---|---|---|
| 6,345,292 B1* | 2/2002 | Daugherty | G06F 17/30902 707/E17.12 |
| 6,525,748 B1* | 2/2003 | Belfiore | G06F 17/3061 707/999.102 |
| 6,598,048 B2 | 7/2003 | Carneal et al. | |
| 6,959,318 B1* | 10/2005 | Tso | G06F 17/30902 707/E17.12 |
| 7,130,890 B1* | 10/2006 | Kumar | H04L 67/2847 707/999.01 |
| 7,191,405 B1* | 3/2007 | Jaramillo | G06F 8/33 715/201 |
| 7,698,256 B1* | 4/2010 | Wang | G06F 16/9562 709/203 |
| 7,908,336 B2* | 3/2011 | Carlson | G06F 17/30902 709/213 |
| 7,975,020 B1* | 7/2011 | Green | G06Q 30/0241 705/14.4 |
| 8,117,593 B1* | 2/2012 | Freeman | G06F 8/33 717/113 |
| 8,356,277 B1* | 1/2013 | Bank | G06F 9/45529 717/111 |
| 8,543,697 B2* | 9/2013 | Knowles | G06F 17/30902 709/225 |
| 8,645,494 B1* | 2/2014 | Altman | H04L 67/02 709/203 |
| 8,682,964 B1* | 3/2014 | Brundage | H04L 67/02 709/203 |
| 8,752,183 B1* | 6/2014 | Heiderich | G06F 21/577 726/25 |
| 8,812,658 B1* | 8/2014 | Teeraparpwong | G06F 3/0484 709/224 |
| 8,984,048 B1* | 3/2015 | Maniscalco | G06F 17/30902 709/201 |
| 9,037,638 B1* | 5/2015 | Lepeska | H04L 29/06047 709/203 |
| 9,106,607 B1* | 8/2015 | Lepeska | H04L 67/2847 |
| 9,456,050 B1* | 9/2016 | Lepeska | H04L 67/2847 |
| 9,495,338 B1* | 11/2016 | Hollis | G06F 40/14 |
| 9,634,993 B2 | 4/2017 | Holloway | H04L 63/0281 |
| 9,658,758 B1* | 5/2017 | Krecichwost | G06Q 30/0277 |
| 9,819,721 B2* | 11/2017 | Bendell | G06F 16/957 |
| 9,912,718 B1* | 3/2018 | Lepeska | H04L 67/02 |
| 10,178,147 B1* | 1/2019 | Kolam | H04L 67/02 |
| 2001/0056460 A1* | 12/2001 | Sahota | H04N 21/4622 709/201 |
| 2002/0013852 A1* | 1/2002 | Janik | H04L 12/2856 709/231 |
| 2002/0095456 A1* | 7/2002 | Wensheng | G06F 17/30864 709/203 |
| 2002/0161824 A1* | 10/2002 | Harris | G06F 17/30905 709/202 |
| 2003/0051031 A1* | 3/2003 | Streble | H04L 29/06 709/224 |
| 2003/0195940 A1* | 10/2003 | Basu | G06F 17/30902 709/213 |
| 2004/0205149 A1 | 10/2004 | Dillon et al. | |
| 2004/0205185 A1* | 10/2004 | Leonik | G06F 17/30899 709/224 |
| 2004/0268225 A1* | 12/2004 | Walsh | G06F 16/957 715/234 |
| 2005/0050520 A1* | 3/2005 | Motoyama | G06F 8/30 717/123 |
| 2005/0086228 A1* | 4/2005 | Gross | G06F 21/6209 |
| 2005/0108517 A1* | 5/2005 | Dillon | G06F 17/30902 713/150 |
| 2005/0114229 A1* | 5/2005 | Ackley | G06Q 30/0601 705/26.1 |
| 2005/0193083 A1* | 9/2005 | Han | H04L 69/04 709/213 |
| 2005/0256836 A1* | 11/2005 | Awamoto | G06F 17/30896 |
| 2005/0289468 A1* | 12/2005 | Kahn | G06F 17/3089 715/738 |
| 2006/0080298 A1* | 4/2006 | Kelly | G06Q 40/04 |
| 2006/0106793 A1* | 5/2006 | Liang | G06F 17/30654 |
| 2007/0083533 A1* | 4/2007 | Mirkazemi | G06F 16/958 |
| 2008/0071929 A1* | 3/2008 | Motte | G06F 17/3089 709/246 |
| 2008/0155016 A1* | 6/2008 | Tsai | H04L 67/2842 709/203 |
| 2008/0222242 A1* | 9/2008 | Weiss | H04L 67/2847 709/203 |
| 2008/0301316 A1* | 12/2008 | Alpern | G06F 9/4843 709/231 |
| 2008/0301766 A1* | 12/2008 | Makino | G06F 21/51 726/1 |
| 2009/0019105 A1* | 1/2009 | Sebastian | G06F 17/30887 709/202 |
| 2009/0089415 A1* | 4/2009 | Lecomte | G06F 16/95 709/224 |
| 2009/0094377 A1* | 4/2009 | Zahavi | G06F 17/30905 709/232 |
| 2009/0199083 A1* | 8/2009 | Sar | G06F 16/9558 715/231 |
| 2009/0287713 A1* | 11/2009 | Anderson | G06Q 30/02 |
| 2010/0180082 A1* | 7/2010 | Sebastian | H04L 67/02 711/126 |
| 2011/0029899 A1* | 2/2011 | Fainberg | G06F 12/0862 715/760 |
| 2011/0055683 A1* | 3/2011 | Jiang | G06F 16/957 715/234 |
| 2011/0066676 A1* | 3/2011 | Kleyzit | G06F 17/30902 709/203 |
| 2011/0099294 A1* | 4/2011 | Kapur | H04L 67/32 709/246 |
| 2011/0137973 A1* | 6/2011 | Wei | H04L 67/1008 709/202 |
| 2011/0225302 A1* | 9/2011 | Park | H04L 65/4084 709/227 |
| 2011/0307238 A1* | 12/2011 | Scoda | G06F 16/9577 703/26 |
| 2012/0089695 A1* | 4/2012 | Fainberg | G06F 17/30902 709/203 |
| 2012/0120204 A1* | 5/2012 | Ohno | H04N 21/25833 348/51 |
| 2012/0191862 A1* | 7/2012 | Kovvali | H04L 29/0881 709/227 |
| 2012/0297291 A1* | 11/2012 | Fainberg | G06F 12/0862 715/234 |
| 2012/0317187 A1* | 12/2012 | Fredricksen | H04L 29/08729 709/203 |
| 2013/0151599 A1* | 6/2013 | Santoro | G06F 3/0481 709/203 |
| 2013/0238808 A1* | 9/2013 | Hallem | H04L 63/0281 709/227 |
| 2014/0026115 A1* | 1/2014 | Bank | G06F 8/38 717/113 |
| 2014/0053059 A1 | 2/2014 | Weber et al. | |
| 2014/0075542 A1* | 3/2014 | Boback | H04L 63/0272 726/15 |
| 2014/0089467 A1* | 3/2014 | Beck | H04L 67/02 709/219 |
| 2014/0120864 A1* | 5/2014 | Manolarakis | H04W 24/08 455/405 |
| 2014/0136952 A1* | 5/2014 | Zhu | G06F 17/2247 715/234 |
| 2014/0143513 A1* | 5/2014 | Reid | G06F 12/16 711/162 |
| 2014/0149533 A1 | 5/2014 | Bergman et al. | |
| 2014/0149596 A1* | 5/2014 | Emerson, III | H04L 67/10 709/231 |
| 2014/0280515 A1* | 9/2014 | Wei | H04L 67/02 709/203 |
| 2014/0379840 A1* | 12/2014 | Dao | H04L 67/2847 709/213 |
| 2015/0026239 A1* | 1/2015 | Hofmann | H04L 67/1095 709/203 |

(56) References Cited

U.S. PATENT DOCUMENTS

| | | | | |
|---|---|---|---|---|
| 2015/0032803 | A1* | 1/2015 | Graham-Cumming | H04L 29/06047 709/203 |
| 2015/0089352 | A1* | 3/2015 | Conboy | H04L 67/02 715/234 |
| 2015/0120821 | A1* | 4/2015 | Bendell | H04L 67/2842 709/203 |
| 2015/0150077 | A1* | 5/2015 | Daimon | G06F 3/0481 726/1 |
| 2015/0193402 | A1* | 7/2015 | Ayoub | G06F 40/14 715/234 |
| 2015/0200994 | A1* | 7/2015 | Jain | H04L 67/02 709/219 |
| 2015/0229733 | A1* | 8/2015 | Yang | G06F 17/30864 709/213 |
| 2015/0295988 | A1* | 10/2015 | Goodwin | H04L 67/2847 709/203 |
| 2015/0347756 | A1* | 12/2015 | Hidayat | G06F 21/57 726/22 |
| 2016/0306894 | A1* | 10/2016 | Liang | G06F 17/2205 |
| 2016/0323352 | A1* | 11/2016 | Luo | H04L 67/02 |
| 2016/0323410 | A1* | 11/2016 | Westberg | H04L 67/2847 |
| 2017/0011133 | A1* | 1/2017 | Shalunov | G06F 17/30902 |
| 2017/0034302 | A1* | 2/2017 | Han | G06F 16/9574 |

OTHER PUBLICATIONS

Lamberta, "Chapter 2 Basics of JavaScript for Animation", "HTML5 Animation with JavaScript", 2011.*
Liu et al., "On Web Page extraction based on position of DIV", 2010.*
Bryan et al., "JavaScript Object Notation (JSON) Patch", RFC6902, 2013.*
Stefanov, "Object-Oriented JavaScript", "Create scalable, reusable high-quality JavaScript applications, and libraries", 2008.*
Freeman, "The Definitive Guide to HTML5", 2011.*
Merriam-Webster, "interference", 2019 (Year: 2019).*
GeeksforGeeks, "Understanding basic JavaScript codes", 2020 (Year: 2020).*
Bodin et al., "A Trusted Mechanized JavaScript Specification", 2014 (Year: 2014).*
Eich et al., "JavaScript Language Specification", JavaScript 1.1, 1996 (Year: 1996).*
Herman et al., "Status Report: Specifying JavaScript with ML", 2007 (Year: 2007).*
Netscape, "The JavaScript Language", 1996 (Year: 1996).*
Wikipedia, "JavaScript", 2020 (Year: 2020).*

* cited by examiner

EXPEDITED SUB-RESOURCE LOADING

TECHNICAL FIELD

Aspects of the disclosure are related to the field of resource loading and parsing, and the use of sub-resources in that process.

TECHNICAL BACKGROUND

Network-provided content, such as Internet web pages and the like, are typically served to end users via networked computer systems. End user requests for network content are processed and the content is responsively provided over various network links. These networked computer systems can include origin or hosting servers that originally host network content, such as web servers for hosting a news website. However, computer systems consisting solely of individual content origins or hosts can become overloaded and slow due to frequent requests of content by end users.

Content delivery networks (CDNs) add a layer of caching between content providers' original servers and end users. Content delivery networks typically have multiple distributed cache nodes that provide end users with faster access to content. When end users request content, such as a web page, the request is handled by a cache node that is configured to respond to the end user requests (instead of an origin server). Specifically, when an end user directs a content request to a given origin server, the domain name system (DNS) resolves to a cache node (frequently the node is selected as an optimized server) instead of the origin server and the cache node handles that request.

Thus a cache node acts as a proxy or cache for one or more origin servers. Various types of origin server content can be cached in the content delivery network's various cache nodes. When all or a portion of the requested content has not been cached by a cache node, that node can request the relevant content (or portion thereof) from the appropriate origin server(s) on behalf of the end user.

More specifically, when a web page is requested by an end user, a typical end user device will send a request for the web page (e.g., by clicking on a link or entering a universal resource locator (URL)) so that a browser on the end user device can load the web page's primary resource (e.g., a primary hypertext mark-up language (HTML) file, including XHTML or HTML5 files and the like). One or more additional files may be referenced in that primary resource. Such referenced files are referred to as sub-resources and can include, but are not limited to, secondary HTML files (files referenced by and relative to a first HTML file (primary resource)), cascading style sheet (CSS) files, JavaScript files, executable code, text files, audio files, Flash files and image files. In many instances, such sub-resources are not cached in a CDN's cache nodes (e.g., due to frequent changes to the sub-resource's content, due to the nature of data stored and/or used with the sub-resource, etc.).

OVERVIEW

Various implementations of expedited sub-resource loading include a cache node or other component of a content delivery network providing HTML files and other primary resources to users when requested. When a user wishes to obtain a web page or the like, the user sends a request for the web page, typically by providing a universal resource locator (URL) and/or other identifying information to a server. When the user is connected to a content delivery network, that server usually is a cache node that caches content from various origin servers and the like.

When the content delivery network receives the user request for a web page or the like, the content delivery network responds by sending a primary resource to the user. This primary resource allows a web browser or other application on the end user's device to begin rendering the desired web page. The content delivery network uses the information in the user's initial request to identify and located any sub-resources that might be required for rendering the web page. The content delivery network obtains (i.e., pre-fetches and pre-loads) any required sub-resources and transmits them to the user when a user request seeking such required sub-resource(s) is received by the content delivery network. As noted above, sub-resources can include files such as JavaScript files, CSS files and more.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Figure 1:
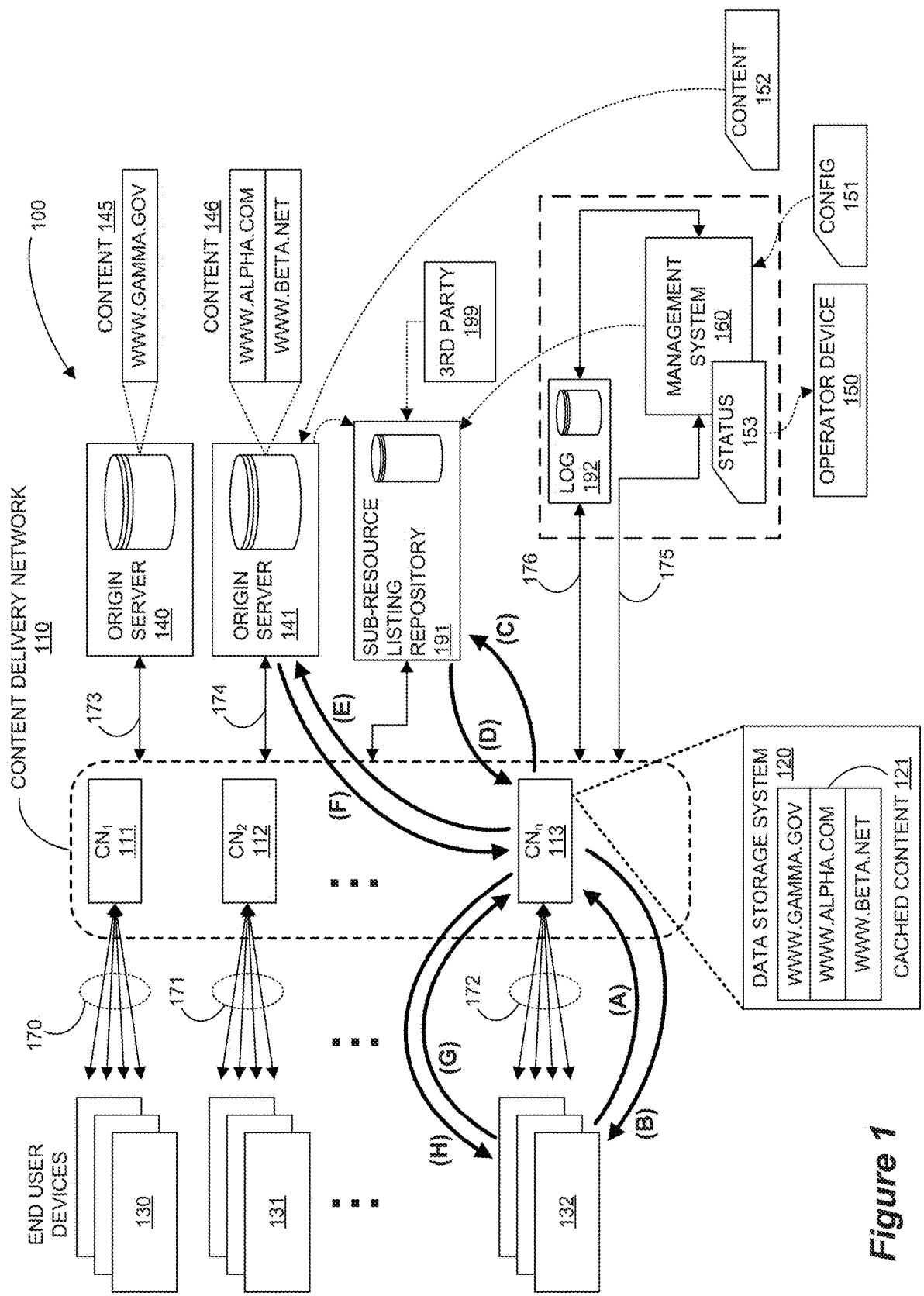
FIG. 1 illustrates a communication system.

Network content such as web content typically comprises text, hypertext markup language (HTML) pages, pictures, digital media content, video, audio, code, scripts, and/or other content viewable on and rendered by an end user device in a browser or other specialized application. Such network-provided content, such as Internet web pages and the like, is typically served to end users via networked computer systems that provide requested content over various network links. A content delivery network is an example of such a networked computer system.

Content delivery network cache nodes respond to end user requests for a web page by sending the web page's "primary resource" (e.g., a hypertext mark-up language (HTML) file, including XHTML or HTML5 files and the like) to an end user device's web browser, which "loads" (or "renders" or "parses") the web page in accordance with an appropriate standard (e.g., the HTML5 specification) and/or model (e.g., the Document Object Model (DOM) that organizes the nodes of a document (web page) in a tree structure known as a DOM tree). Web browsers identify and organize the various elements of a web page to generate the page displayed on a user's device.

Frequently, one or more additional files are referenced in the primary resource, typically at insertion points on a web page that is being rendered. Such referenced files are referred to as "sub-resources" and can include, but are not limited to, JavaScript files, secondary HTML files (files referenced by and relative to a first HTML file (primary resource)), cascading style sheet (CSS) files, Flash files and image files. As part of a web page that interacts with the DOM of the page, JavaScript can add client-side behavior to web pages that are based on HTML (e.g., to animate page elements, resize elements, create interactive content).

In many instances where web pages are served by cache nodes in a content delivery network, JavaScript code and other sub-resources are not cached in the CDN's cache nodes (e.g., due to frequent changes to the sub-resource's content, due to the nature of data stored and/or used with the sub-resource, etc.). Instead, sub-resources that are external to the primary resource HTML file must be fetched during the user's parsing of the web page, a process that can delay web page rendering on a user device. A typical parsing algorithm and/or web page DOM tree builder usually halts when it encounters a script and must download and execute the referenced script before parsing can continue, thus causing delays due to the need to fully download the script and all stylesheets in the web page document. In addition, if images are delayed, the page appears incomplete.

Expedited sub-resource loading implementations disclosed and taught herein reduce script-retrieval and other sub-resource-retrieval delays encountered in earlier systems and methods by anticipatory, proactive fetching of the relevant sub-resource(s) by the CDN (e.g., by the relevant cache node). This anticipatory fetching can be implemented in various ways to achieve improved performance as compared to earlier content delivery system operations. Moreover, some expedited sub-resource loading implementations amend the primary resource prior to serving it to the user so that sub-resources are located at or near the top of the primary resource's body, further expediting page rendering.

FIG. 1 illustrates an exemplary content delivery system 100 that includes content delivery network (CDN) 110, end user devices 130-132, origin servers 140-141, management system 160, sub-resource listing repository 191 and log 192. Content delivery network 110 includes one or more cache nodes (CNs) 111-113, each of which can include suitable processing resources and one or more data storage systems. Each CN 111-113 communicates with each other CN over CDN network links. Each of CN 111-113 can include one or more data storage systems, such as data storage system 120 illustrated for CN 113. End user devices 130-132 are representative of a plurality of end user communication devices that can request and receive content from network 110. The transfer of content from CDN 110 to a given end user device is initiated when a specific user device 130-132 associated with a given cache node 111-113 transmits a request for content to its corresponding cache node (any number of end user devices 130-132 can be associated with a single cache node). Cache nodes 111-113 and end users 130-132 communicate over associated network links 170-172. Other network components likewise communicate over appropriate links. Content delivery network 110 and management system 160 communicate over link 175. Likewise CDN 110 and log 192 communicate over link 176.

Content cached in and/or obtained by one of the CNs 111-113 is used to respond to end user requests by transmitting requested content to the end user device. As is well known in the art, CNs 111-113 can cache content from origin servers 140-141 periodically, on demand, etc. and can also seek and obtain content that is not cached by communicating directly with origin servers 140-141 (e.g., over associated network links 173-174). FIG. 1 shows cached content 121 included in data storage system 120 of cache node 113 as comprised of content 145-146. Other configurations are possible, including subsets of content 145-146 being cached in individual ones of CN 111-113. Although FIG. 1 shows content 145-146 of origin servers 140-141 being cached by data storage system 120, other content can be handled by CN 111-113. For example, dynamic content generated by activities of end user devices 130-132 need not originally reside on origin servers 140-141, and can be generated due to scripting or code included in web page content delivered by CN 111-113. This dynamic content can also be cached by ones of CN 111-113, and can be specific to a particular end user device during a communication session. Moreover, as noted above, sub-resources such as JavaScript code might only be available from origin servers or other sources other than CDN cache nodes.

Management system 160 collects and delivers various administrative and other data, for example configuration changes and status information for various parties (e.g., system operators, origin server operators, managers and the like). For example, operator device 150 can transfer configuration data 151 for delivery to management system 160, where configuration data 151 can alter the handling of network content requests by CDN 111-113, among other operations. Also, management system 160 can monitor status information for the operation of CDN 111-113, such as operational statistics, and provide status information 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include multiple operator devices for receiving status information, providing configuration information, or transferring content to origin servers.

With specific regard to expedited sub-resource loading in a content delivery network, FIG. 1 illustrates one or more implementations of an operation (designated as steps (A) through (H) in FIG. 1) implemented in system 100 in which end user 132 requests a web page that requires a specific JavaScript code for parsing of the requested web page by the end user's browser (exemplary operations such as these explaining JavaScript code retrieval can be performed with regard to other sub-resources as well, and can be performed for multiple sub-resources). The user sends a request to cache node 113 (step (A)), for example a hypertext transfer protocol (HTTP) request that includes a URL requesting a web page that can be rendered using an HTML file (i.e., a "primary resource"). CN 113 serves the HTML file corresponding to the requested web page by transmitting that HTML file to end user 132 (step (B)) for parsing by the end user's browser.

Using information in the received end user request, CN 113 identifies JavaScript code that is required for rendering the requested web page. In FIG. 1 this identification is performed when the cache node 113 consults sub-resource listing repository 191 (step (C)) to determine whether repository 191 has a record of JavaScript codes (whether obtainable from an origin server 141 or otherwise) historically requested by an end user in connection with parsing the requested web page. JavaScript code (and any other sub-resources) likely to be requested by end user 132 is identified by repository 191 and locations for such code are sent to CN 113 (step (D)). CN 113 then requisitions (step (E)) the identified JavaScript code from origin server 141 and/or any other identified JavaScript code source, and subsequently receives the JavaScript code (step (F)) likely to be required by end user 132. CN 113 then awaits a fetch request from end user 132 (step (G)) for the required JavaScript code. CN 113 immediately sends the JavaScript code retrieved from origin server 141 to end user 132 (step (H)). This process can be used in connection with each sub-resource that CN 113 deems likely to be needed and expedited sub-resource pre-loading for multiple sub-resources can thus be performed in parallel by CN 113 in this manner.

Repository 191 can be a database or other memory/storage location that maintains a URL-based listing of sub-resources that have been required to render a given primary resource such as an HTML page. Repository 191 can be a single network location accessible to all cache nodes in a CDN. Alternatively, each cache node can have its own implementation of repository 191 for faster access (situated internally within a memory or storage location inside each cache node or external to it), where each CN's repository is updated periodically with current historical and/or other data to facilitate expedited sub-resource loading for end users using that CN. When repository 191 is internal to a given cache node 113, steps (C) and (D) of FIG. 1 are performed within CN 113.

Repository 191 can store a list of sub-resource locations (e.g., servers, IP addresses, etc.) and index such listings using URLs and/or other searchable data. The listed sub-resource locations can contain the JavaScript codes and other sub-resources that have historically been requested for a particular URL in one or more previous end user requests for that URL, especially if those requests have come from multiple, different end users over time. When a CDN end user requests a given primary resource (e.g., HTML file), repository 191 is checked and any JavaScript and/or other sub-resource entries for the requested primary resource are identified and then requested by the CN 113. Cache node 113 performs this pre-fetching/pre-loading of sub-resources proactively, independent of and in parallel with the parsing of the primary resource by end user 132. Unlike earlier systems and methods, cache node 113 does not wait to be prompted by an end user request before commencing the fetching process.

One non-limiting example of a URL/web page that might utilize implementations disclosed herein is a news website that has uniform/static content (e.g., news stories) that all users can access using a standard URL request. However, that site's web pages might include a customized "favorites" element that is user-specific and is implemented as JavaScript code. A JavaScript sub-resource like "MyFavorites.js" might therefore need to be downloaded from the news site's origin server in rendering one of the site's pages for a given end user. In this type of setting, a CDN operator may have one or more advantages over other parties that might be seeking content in similar ways—first, the CDN can acquire historical data from all users of the subject CDN cache node or the entire content delivery network itself so that the library or database of sub-resources and their connection to specific URLs is much more robust; and, second, a CDN may have access to end users' cookies and other data that allows the CDN to pre-load user-specific content such as sub-resources used in connection with web pages and other content.

Implementations of expedited sub-resource loading can be used in connection with earlier tools and techniques, too. For example, while the web page parser of an end user's browser waits for a script to download and execute, a preload scanner (e.g., as found in WebKit) can search ahead in the HTML file for additional scripts and/or other sub-resources that will require fetching. Once these sub-resources are identified, a request for them can be sent to the relevant cache node, which will have them ready to return to the end user.

Cache node 113 may proactively send fetch requests to one or more sub-resource sources. For each source from which one or more sub-resources are needed, CN 113 sends the appropriate request (e.g., a GET command), receives the requested sub-resource(s), and holds the sub-resource(s) until a request from the end user device 132.

Figure 2:
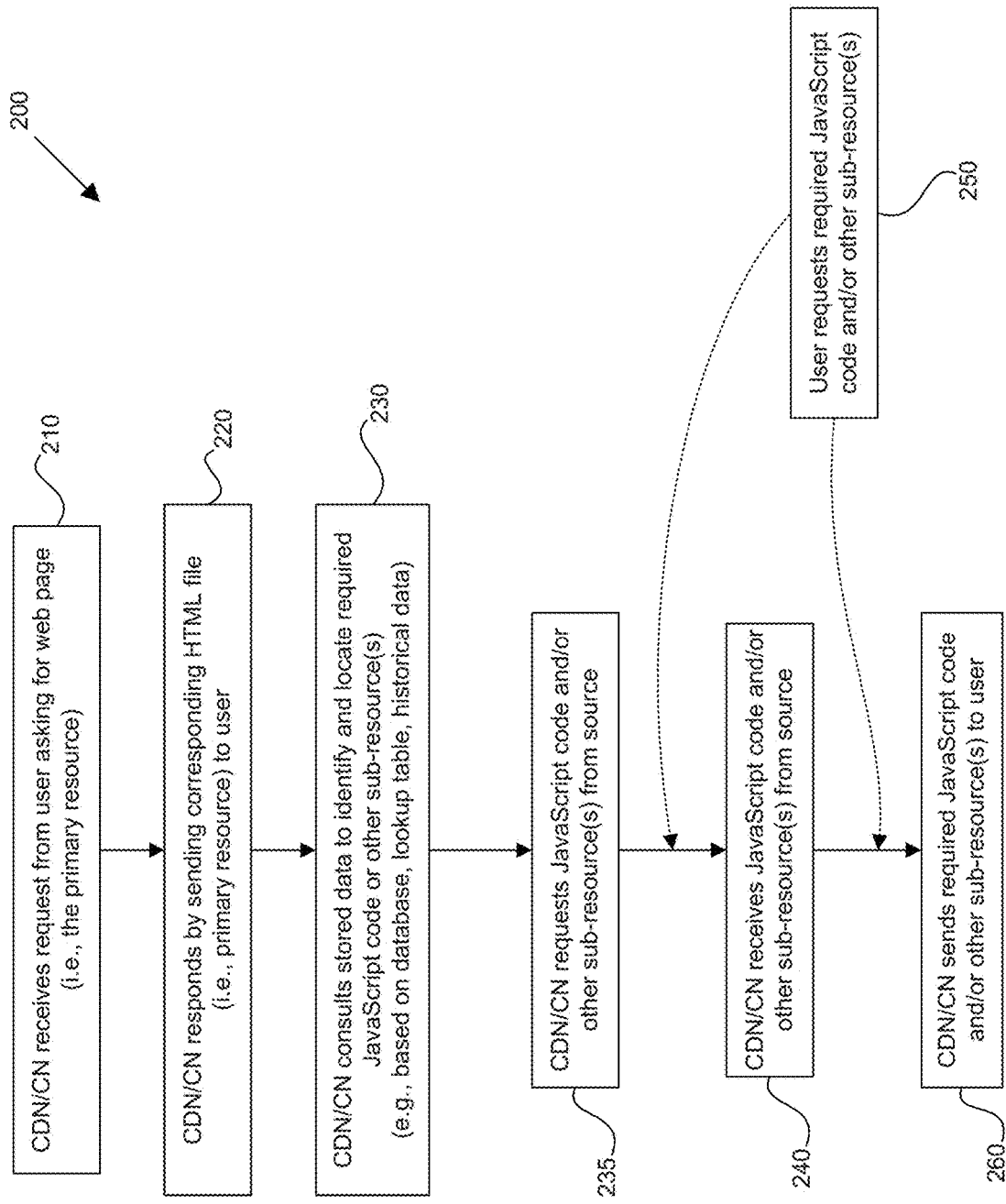
FIG. 2 illustrates a method of operation of a content delivery system.

FIG. 2 illustrates one or more non-limiting examples of a method of operation 200 of a content delivery network (or a network component such as a cache node within the network) in which expedited sub-resource loading is implemented. In some implementations, for example, a cache node pre-fetches and/or pre-loads JavaScript code needed for rendering by a user's browser. In these examples, "expedited sub-resource loading," "pre-loading" and "pre-fetching" can be interpreted as generally meaning that the content delivery network (e.g., a cache node or other CDN component) begins identifying one or more sub-resources needed by a user's browser or the like prior to receiving a user request for such sub-resource(s). The content delivery network then obtains the required sub-resource(s). The "CDN/CN" referred to with regard to FIG. 2 is a cache node, another CDN component or a content delivery network generally implementing the method.

The CDN/CN receives an end user request (210) asking for a web page (i.e., a primary resource), for example asking for a web page by using a URL reference that corresponds to an HTML file. The CDN/CN responds to the request by sending the corresponding HTML file to the user (220). The receipt of the HTML file (primary resource) by the end user device allows that device's browser (or other application) to begin parsing the file and rendering the requested web page. After receiving the user request for the primary resource, but prior to receiving a user request for JavaScript code or other sub-resources, the CDN/CN identifies needed JavaScript code and/or other sub-resources by consulting a database, lookup table, historical data or the like (230) to identify and locate JavaScript code and/or other sub-resources likely to be required for rendering the web page while the end user device is parsing the HTML file (in some implementations identifying and/or obtaining the identity of the required sub-resource(s) can begin prior to the commencement of the user's parsing of the primary resource).

Identifying and locating a sub-resource can include the CDN/CN consulting a database, lookup table, historical data or other repository of sub-resource identities, as noted above with regard to repository 191 of FIG. 1. Such a repository can be indexed using various primary resources' URLs, file names and/or other factors. The repository returns the identity and location (source) of the required sub-resource(s) to the CDN/CN.

The CDN/CN then sends a request (235) for the required JavaScript code and/or other sub-resource(s) from the appropriate source(s) and subsequently receives the required JavaScript code and/or other sub-resource(s) from the appropriate source(s) (240). This source can be an origin server for the requested web page, as shown in FIG. 1, or it can be another source like jQuery that provides JavaScript code or the like. The requested JavaScript code (sub-resource) is returned to the CDN/CN, where the sub-resource(s) can be stored until requested by the end user device. A user request (250) seeking the required sub-resource(s) is received by the CDN/CN, which can happen any time after the CDN/CN consulted the stored data at (240). After receiving the user request (250), the CDN/CN then responds by forwarding the required sub-resource(s) to the end user device (260). In some implementations the CDN/CN can send the required JavaScript code and/or other sub-resources to the end user device without waiting for a second end user device request (250) asking for the JavaScript code and/or other sub-resources.

In some cases, the end user's request for the required sub-resource(s) might be sent to the CDN/CN prior to the CDN/CN receiving the required sub-resource(s) from their storage location. However, the CDN/CN proactively sends its request to the required sub-resource(s) storage location (i.e., prior to receiving any request or other notification of a need for the required sub-resource(s) from the end user). Thus the timing and sequencing of the various requests, replies, etc. can differ (e.g., being dependent upon the speed of the end user device parsing and the position of the needed sub-resource in the web page, HTML file or other primary resource being rendered by the end user device browser), but the CDN/CN's identification and retrieval of the required sub-resource(s) is initiated prior to a follow-up user request seeking the required sub-resources. Some exemplary timing/sequencing differences can be seen in several of the Figures.

Figure 3:
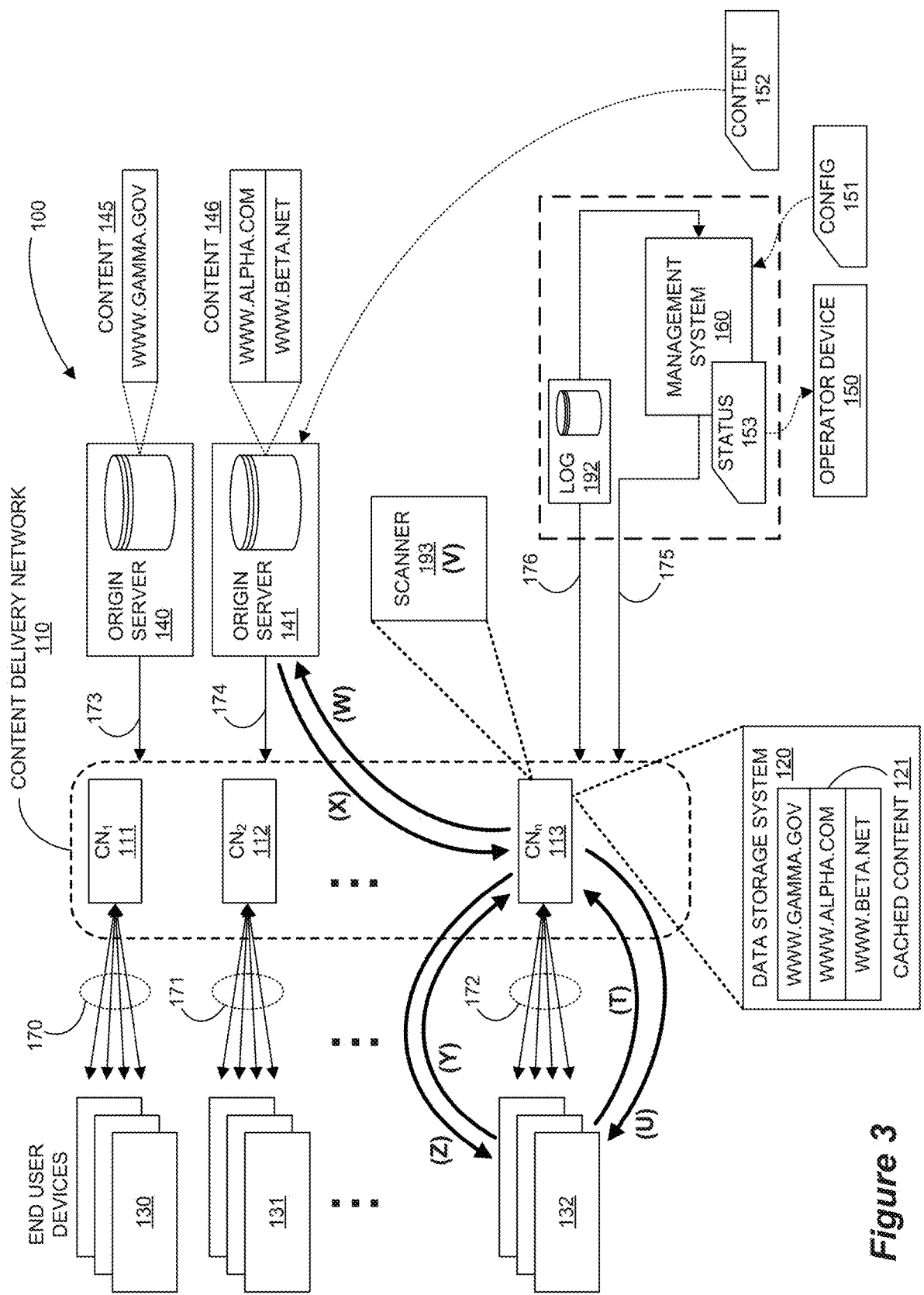
FIG. 3 illustrates a communication system.

With specific regard to other implementations of expedited sub-resource loading in a content delivery network, FIG. 3 illustrates one or more additional implementations of an operation (designated as steps (T) through (Z) in FIG. 3) implemented in system 100 in which end user 132 requests a web page that requires a specific JavaScript code (and/or another sub-resource—these examples explaining JavaScript retrieval can be performed with regard to other sub-resources as well) for parsing of the requested web page by the end user's browser. The user sends a request to cache node 113 (step (T)) requesting a web page that can be rendered using an HTML file (i.e., a "primary resource"). CN 113 serves the HTML file corresponding to the requested web page to end user 132 (step (U)) for parsing.

Rather than consulting a repository or other data to obtain the JavaScript (and/or other sub-resource) identity and location, CN 113 identifies required JavaScript code by scanning the HTML file (step (V)). Scanning of HTML files and/or other primary resources can be performed by a scanner 193 that can be implemented in a variety of ways, e.g., a scanning module, processor, service or the like. The results of the scan are used by CN 113 to requisition (step (W)) the identified JavaScript code from origin server 141 and/or any other identified JavaScript code source. The JavaScript code is received (step (X)) and CN 113 then awaits a fetch request from end user 132 (step (Y)) for the required JavaScript code. CN 113 immediately sends the retrieved JavaScript code to user 132 (step (Z)). These implementations have improved reliability over implementations in which the CDN consults a database, lookup table, etc. because scanning establishes the JavaScript code and other sub-resources that are actually required in a given HTML file, rather than relying on past history and/or updating of databases and the like. This process can be used in connection with each detected sub-resource and expedited pre-loading for multiple sub-resources can thus be performed in parallel by CN 113 in this manner. Again, unlike earlier systems and methods, cache node 113 does not wait to be prompted by an end user request before commencing the fetching process.

Figure 4:
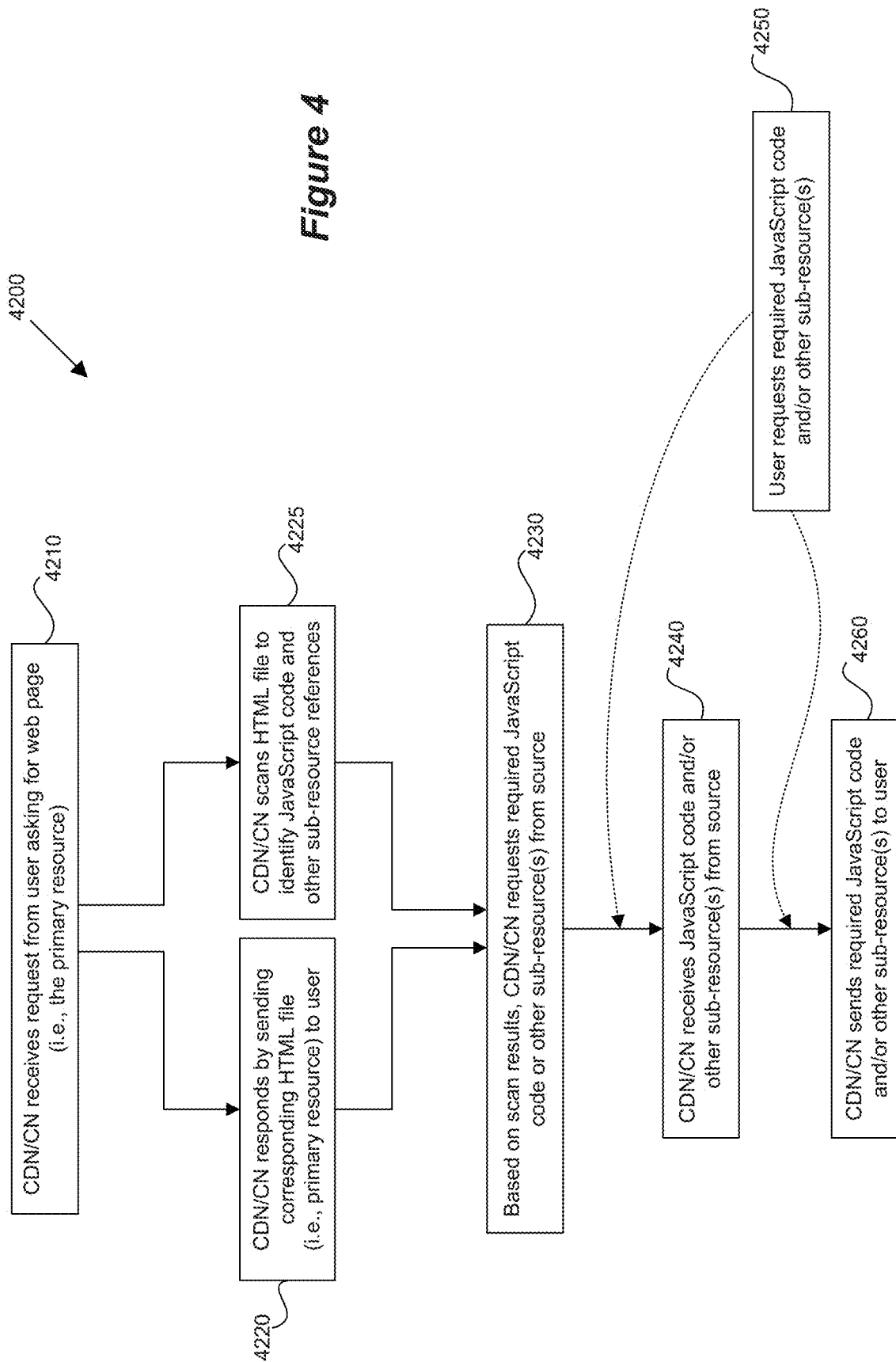
FIG. 4 illustrates a method of operation of a content delivery system.

FIG. 4 illustrates one or more non-limiting examples of a method of operation 4200 of a content delivery network (or a network component such as a cache node within the network) in which expedited sub-resource loading is implemented. Again the content delivery network obtains the identity of and source for one or more sub-resources required for rendering a primary resource by an end user device browser or the like prior to receiving a user request for such sub-resource(s). The content delivery network requests and subsequently receives the required sub-resource(s).

The CDN/CN receives a user request (4210) asking for a web page and responds to the request by sending the user the corresponding HTML file (4220). At approximately the same time as it sends the user the HTML file (the structure of FIG. 4 is not meant to imply simultaneity or lack thereof between steps 4220 and 4225; only that they occur during the same general time frame), but prior to receiving any request for JavaScript code or other sub-resources, the CDN/CN scans the HTML file to identify any JavaScript code and/or other sub-resources required for rendering the requested web page (4225). Scanning by the CDN/CN produces the identity of and source for the required JavaScript code or other sub-resource(s).

The CDN/CN then sends a request (4230) for the required JavaScript code and/or other sub-resource(s) from the appropriate source(s) based on the scan results. The requested JavaScript code (sub-resource) is received by the CDN/CN (4240), where the sub-resource(s) can be stored until requested by the end user device. A user request (4250) seeking the required sub-resource(s) is received by the CDN/CN, which can happen any time after the CDN/CN begins its scan (4225) of the HTML file. After receiving the user request (4250), the CDN/CN then responds by sending the required sub-resource(s) to the end user device (4260). Again, in some implementations the CDN/CN can send the required JavaScript code and/or other sub-resources to the end user device without waiting for a second end user device request (4250) asking for the JavaScript code and/or other sub-resources.

Again, the timing and sequencing of the various requests, replies, etc. can differ (e.g., being dependent upon the speed of the end user device parsing and the position of the needed sub-resource in the web page, HTML file or other primary resource being rendered by the end user device browser), but the CDN/CN's identification and retrieval of the required sub-resource(s) is initiated prior to a follow-up user request seeking the required sub-resources. Some exemplary timing/sequencing differences can be seen in several of the Figures.

Figure 5A:
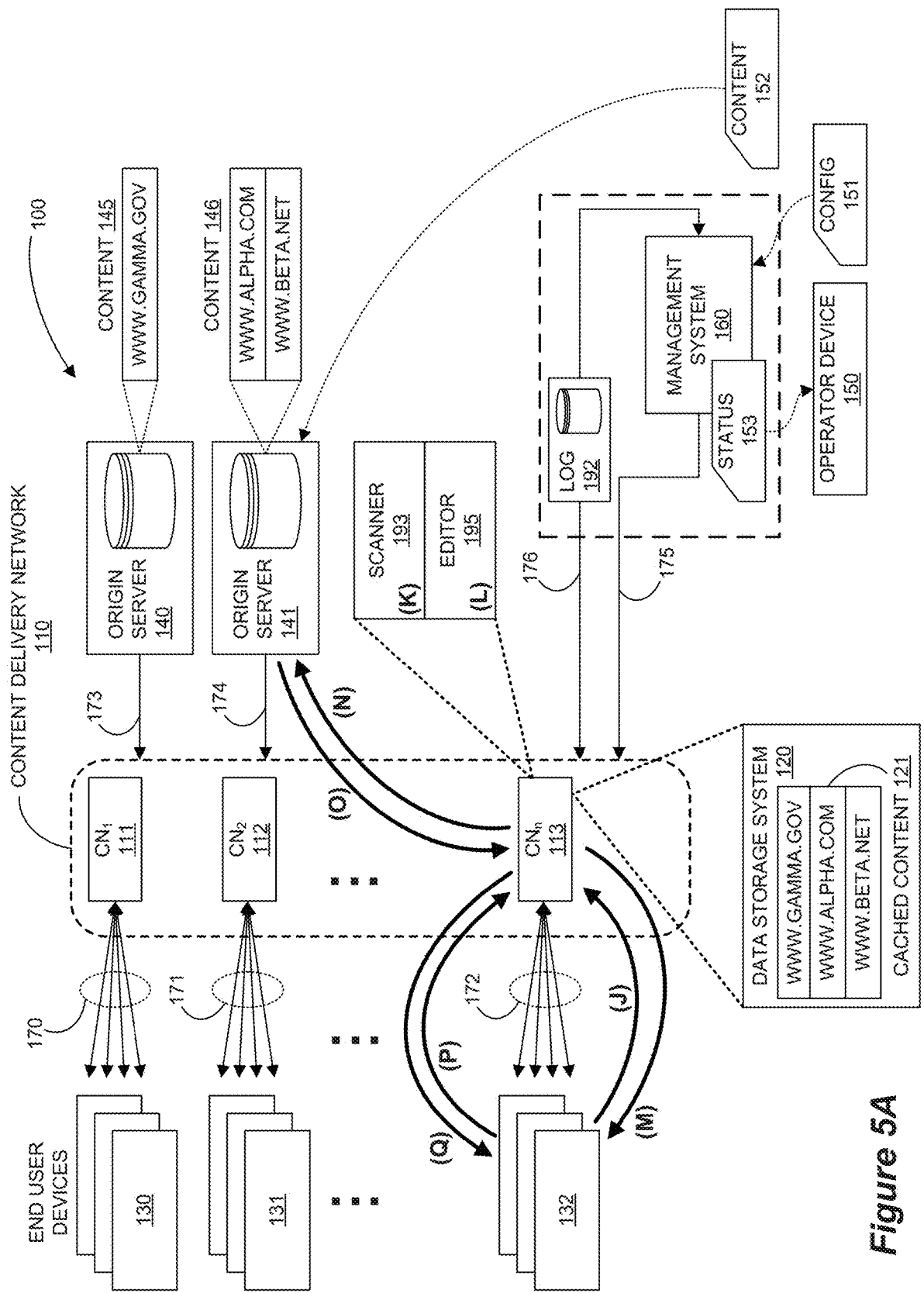
FIG. 5A illustrates a communication system.
Figure 5B:
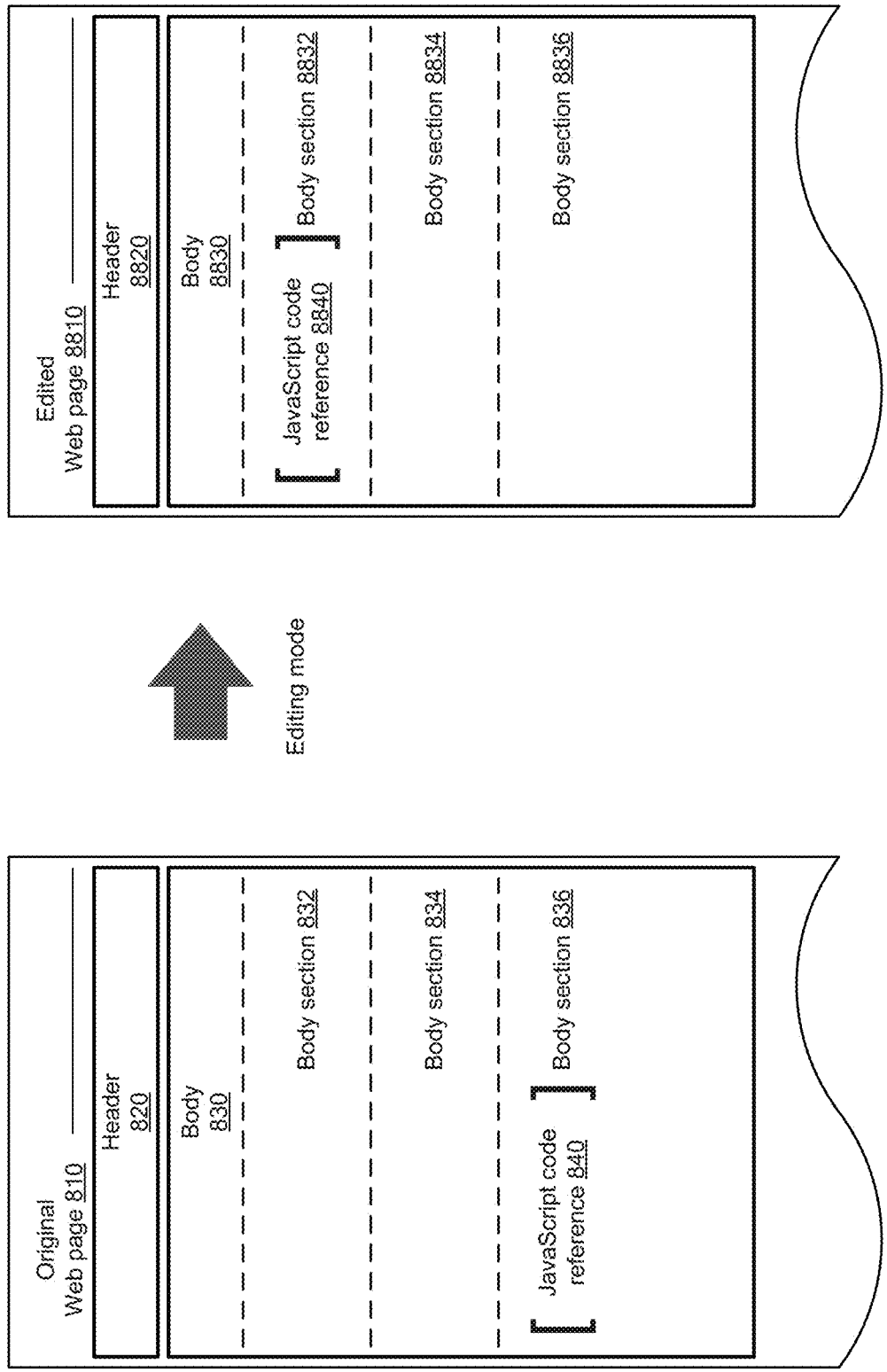
FIG. 5B illustrates a method of operation of a content delivery system.
Figure 6:
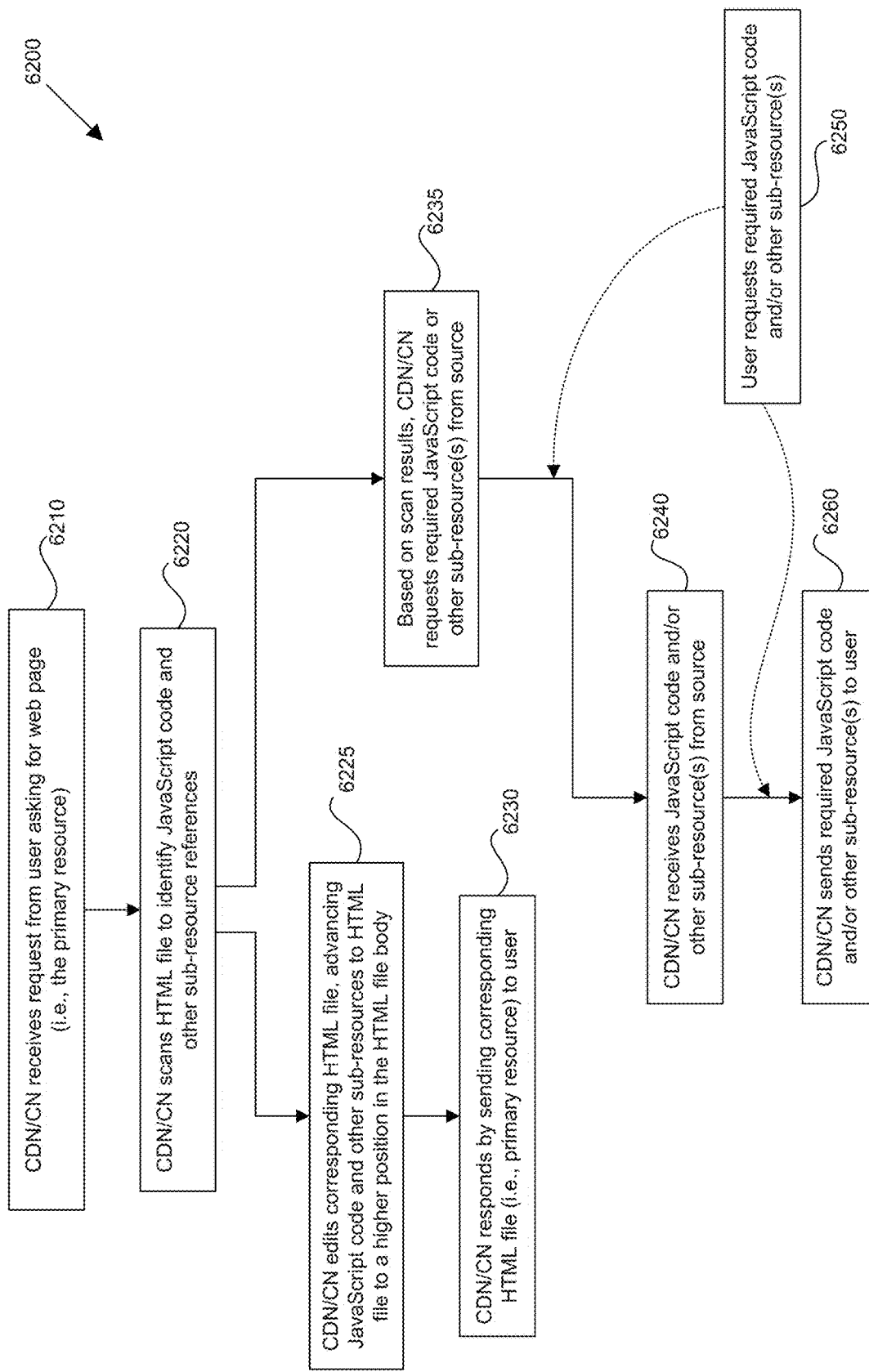
FIG. 6 illustrates a method of operation of a content delivery system.

In yet other expedited sub-resource loading implementations, an additional step of amending the HTML file or other primary resource can be included, as seen in FIGS. 5A, 5B and 6. The exemplary implementations of FIGS. 5A, 5B and 6 utilize scanning (similar to that shown in connection with implementations illustrated in FIGS. 3 and 4) to identify JavaScript code and other sub-resources, but primary resource revision can also be implemented with implementations similar to those of FIGS. 1 and 2 in which the cache node consults a database or the like to obtain identity and location information.

FIG. 5A illustrates one or more additional implementations of an operation (designated as steps (J) through (Q) in FIG. 5A) implemented in system 100 in which end user 132 requests a web page that requires a specific JavaScript code for parsing a web page requested by the user. The user sends the web page request to cache node 113 (step (J)). CN 113 identifies required JavaScript code by scanning the HTML file (step (K)), again using a scanner 193 within CN 113. Using the scanning results, CN 113 evaluates whether a given JavaScript code or other sub-resource reference can be moved to a location higher in the HTML file. If so, then CN 113 edits the HTML file (step (L)). Editing of HTML files and/or other primary resources can be performed by an editor 195 that can be implemented in CN 113 in a variety of ways, e.g., an editing module, processor, service or the like.

CN 113 serves the edited HTML file corresponding to the requested web page to user 132 (step (M)). Scanning results are used by CN 113 to requisition (step (N)) the identified JavaScript code from origin server 141 and/or another source The JavaScript code is received (step (O)) and CN 113 then awaits a fetch request from end user 132 (step (P)) for the required JavaScript code. Editing of the HTML file at step (L) moves the JavaScript code reference closer to the top of the HTML file body, thus reducing the time it takes the user's browser to reach that reference and request the required JavaScript code. Once CN 113 receives the required JavaScript code (sub-resource) request, the cache node 113 immediately sends the retrieved JavaScript code to user 132 (step (Q)). This process can be used in connection with each detected sub-resource and expedited pre-loading for multiple sub-resources can thus be performed in parallel by CN 113 in this manner. Again, unlike earlier systems and methods, cache node 113 does not wait to be prompted by an end user request before commencing the fetching process.

As seen in FIG. 5B, an original HTML file 810 may originally have a header 820 and a body 830 conforming to standard HTML structure. Body 830 can be segmented into headings and paragraphs. In original HTML file 810, body 230 is segregated into sections—upper section 832, intermediate section 834 and lower section 836. A JavaScript code reference 840 is located in lower section 834 and thus will not be addressed by the browser's parser until it reaches that lower section. To expedite fetching, parsing and rendering of the web page with regard to JavaScript code reference 840, editors in implementations such as those shown in FIG. 5A edit the original web page 810 to generate an edited web page 8810 in which the HTML file has had JavaScript code reference moved from lower section 8836 up to upper section 8832.

FIG. 6 illustrates one or more non-limiting examples of a method of operation 6200 of a content delivery network implementing expedited sub-resource loading. Again the content delivery network obtains the identity of and a source for JavaScript code and/or one or more sub-resources required for rendering a web page by a user's browser or the like prior to receiving a user request for such sub-resource(s).

The CDN/CN receives a user request (6210) asking for a web page. The CDN/CN scans the HTML file to identify any JavaScript code and/or other sub-resource references (6220 and to determine the source for the required JavaScript code or other sub-resource(s). Scanning also provides the CDN/CN with information concerning the position(s) of the JavaScript code and/or other sub-resources in the HTML file.

The CDN/CN edits the HTML file (6225) based on the scanning results, advancing JavaScript code and other sub-resource references to a higher position in the HTML file body. After thus editing the HTML file, the CDN/CN sends the edited HTML file (6230) to the user for parsing by the user's browser. The scan results also are used to generate one or more requests for identified JavaScript code and other sub-resources (6235), using locations and sources obtained from the scan.

The requested JavaScript code (sub-resource) is returned to the CDN/CN (6240), where the sub-resource(s) can be stored until requested by the end user device. A user request (6250) seeking the required sub-resource(s) is received by the CDN/CN and the CDN/CN then responds by forwarding the required sub-resource(s) to the end user device (6260). Again, in some implementations the CDN/CN can send the required JavaScript code and/or other sub-resources to the end user device without waiting for a second end user device request (6250) asking for the JavaScript code and/or other sub-resources.

Again, the timing and sequencing of the various requests, replies, etc. can differ (e.g., being dependent upon the speed of the end user device parsing and the position of the needed sub-resource in the web page, HTML file or other primary resource being rendered by the end user device browser), but the CDN/CN's identification and retrieval of the required sub-resource(s) is initiated prior to a follow-up user request seeking the required sub-resources. Some exemplary timing/sequencing differences can be seen in several of the Figures.

Figure 7A:
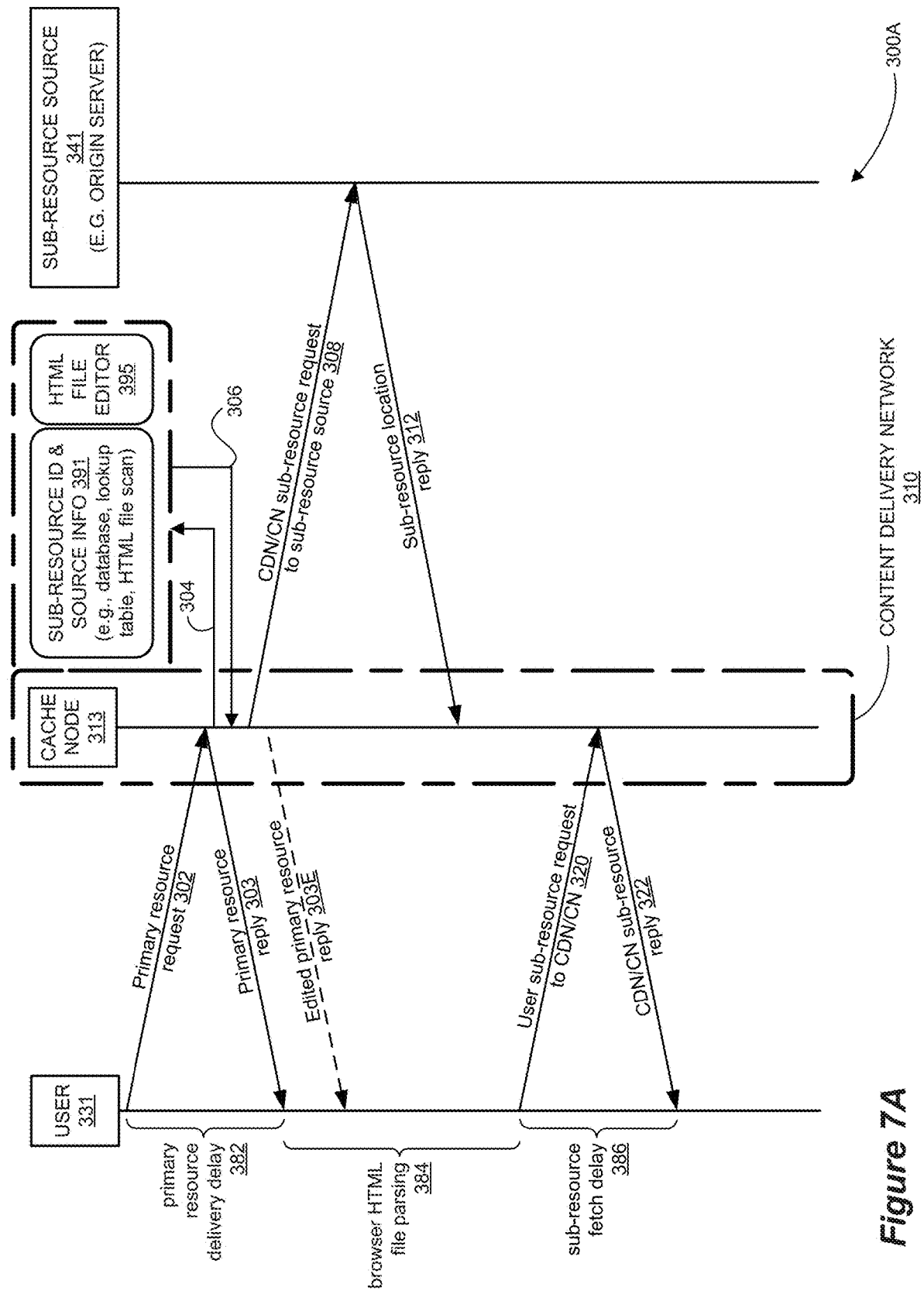
FIG. 7A is a sequence diagram illustrating an exemplary method of operating a communication system.

FIG. 7A illustrates one or more implementations of expedited sub-resource loading 300A. End user 331 initially sends a primary resource request 302 to a content delivery network 310 (e.g., cache node 313 or other CDN component, referred to as "CDN/CN 313" herein), which replies 303 by sending the requested primary resource (that primary resource may be cached at CDN/CN 313 or, if not, CDN/CN 313 might obtain the requested primary resource from a suitable source such as an origin server). A primary resource delivery delay 382 elapses while the end user 331 awaits the primary resource file from CDN/CN 313. (Where a given implementation utilizes editing of the HTML file to expedite web page rendering, the primary resource reply may be slightly due to scanning and editing—the primary resource reply containing an edited HTML file may be sent 303E as shown in FIG. 7A.)

Using information concerning the requested primary resource, CDN/CN 313 obtains the sub-resource identification (ID) from sub-resource identifier 391. Identifier 391 can be a database, lookup table, scanner or other module or service that receives a primary resource reference 304 from CDN/CN 313 and returns the identity 306 of one or more sub-resources and the location(s) from which CDN/CN 313 can obtain the identified sub-resource(s). That sub-resource identification and location information 391 may be part of the CDN 310 or may be outside the CDN. Moreover, if the sub-resource identity and location information is obtained from scanning the primary resource, then unit 391 might be part of a cache node 313 or other CDN component. CDN/CN 313 then sends a request 308 to the sub-resource location (e.g., a GET command) and the location returns 312 the requested sub-resource(s) to CDN/CN 313. In some implementations, an editor 395 also may optionally be provided for editing an HTML file or the like, for example to advance JavaScript code and/or other sub-resources to positions that are higher in a given HTML file.

In the meantime, end user device 331 parses the requested primary resource and, during that parsing process (which generates a browser parsing delay 384), rendering the primary resource requires one or more sub-resources (e.g., JavaScript files, etc.). When the browser operating on user device 331 encounters the sub-resource reference in the primary resource file, end user device 331 sends a request 320 (e.g., a GET command) to CDN/CN 313. Because CDN/CN 313 has pre-fetched the sub-resource(s) referred in the primary resource, a reply 322 containing the requested sub-resource(s) by end user device 331 can be sent promptly by CDN/CN 313. Again, in some implementations the cache node can send the required JavaScript code and/or other sub-resources to the end user device without waiting for a second end user device request (320) asking for the JavaScript code and/or other sub-resources.

Figure 7B:
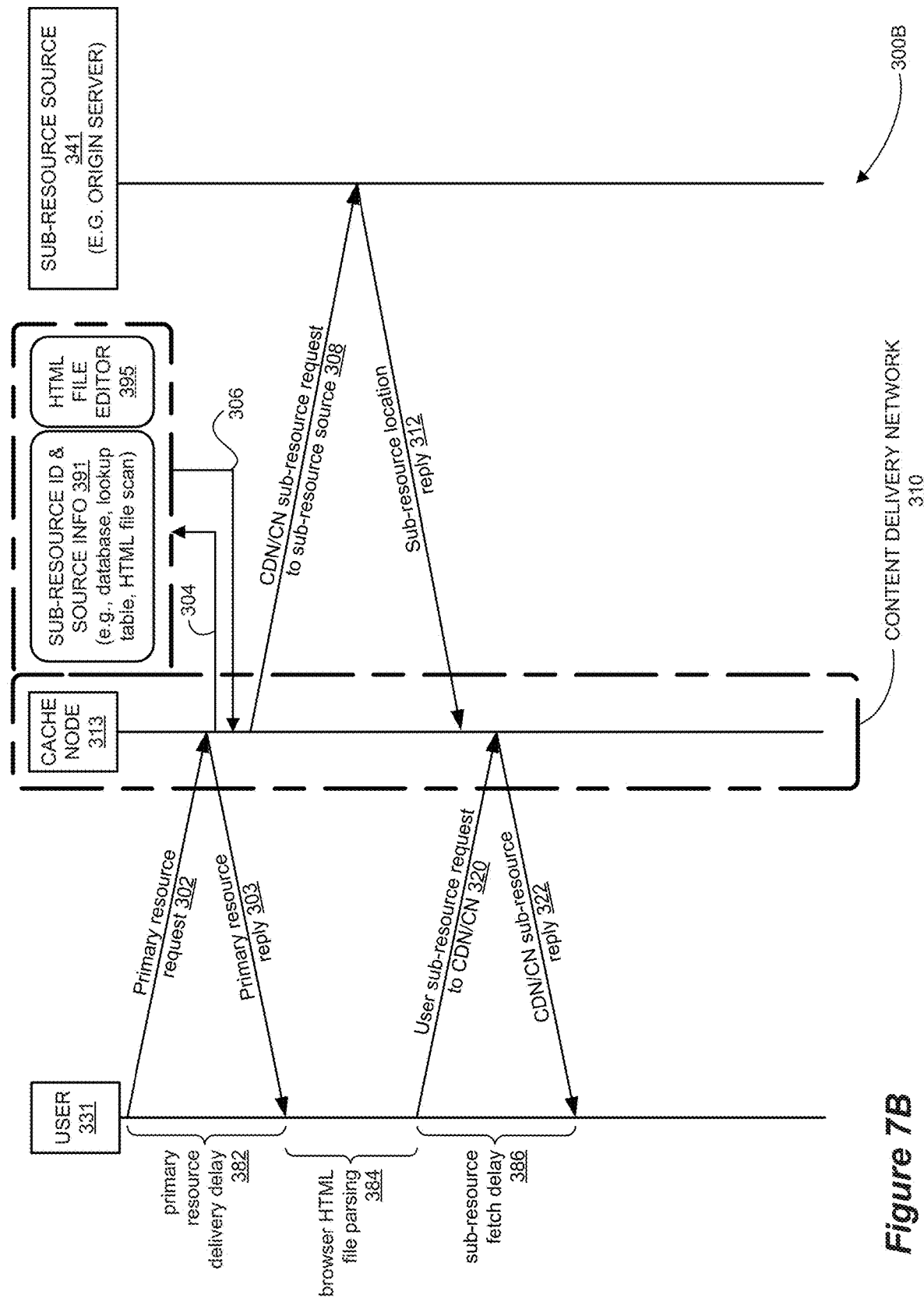
FIG. 7B is a sequence diagram illustrating an exemplary method of operating a communication system.
Figure 7C:
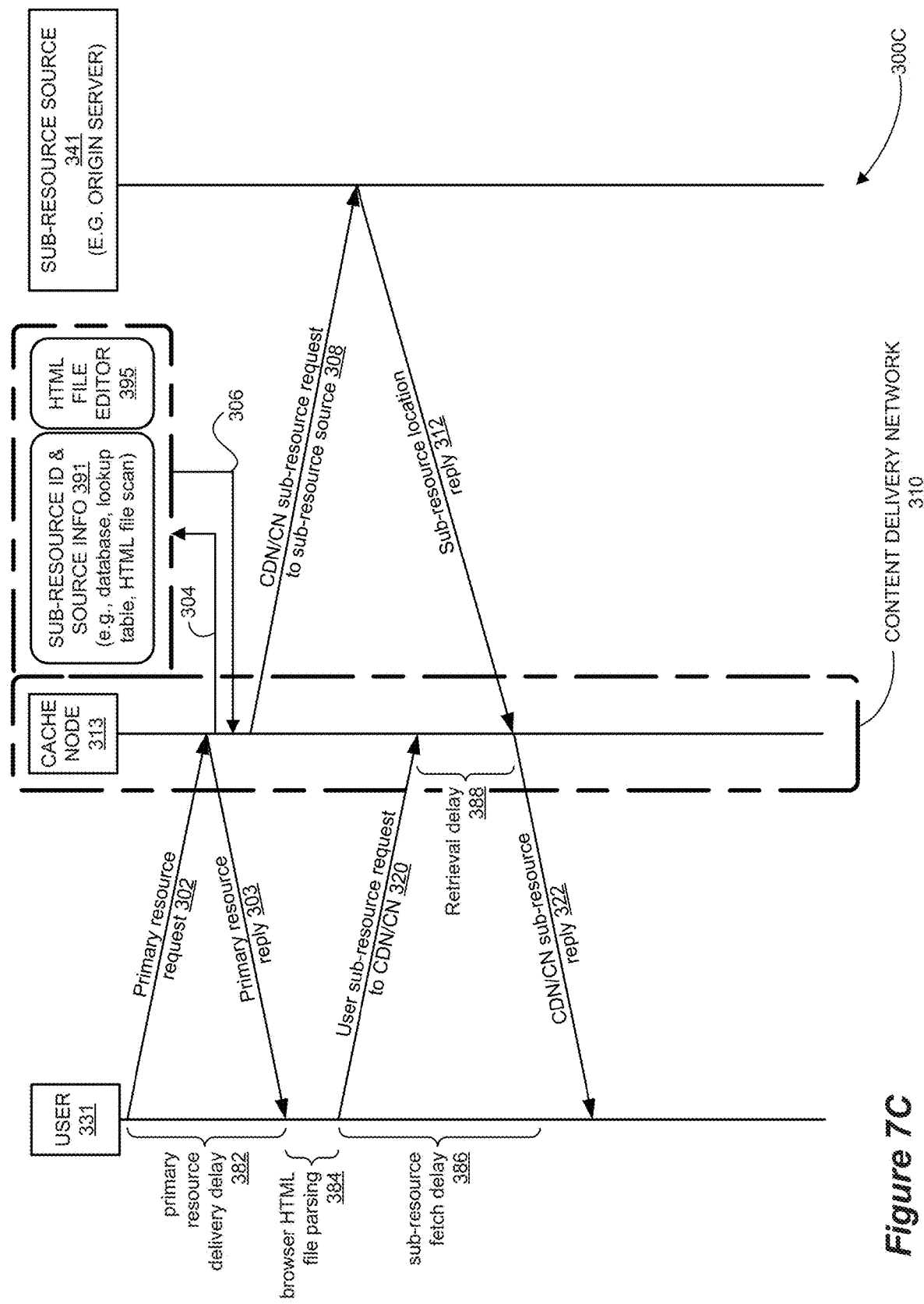
FIG. 7C is a sequence diagram illustrating an exemplary method of operating a communication system.

In the implementation(s) of FIG. 7A, user 331 sends its sub-resource request 320 after the CDN/CN 313 has already retrieved the required sub-resource(s), possibly due to a longer parsing of the primary resource by the end user device 331. FIG. 7B illustrates a somewhat similar situation, except that in method 300B, the user's sub-resource request 320 is sent before CDN/CN 313 has received the sub-resource(s) requested from location 341. This has virtually no impact on user 331 because the required sub-resource(s) can be sent immediately by CDN/CN 313 when it receives the user required sub-resource request 320. FIG. 7C shows yet another timing scenario in which method 300C is performed. In this case, the user's sub-resource request is received by CDN/CN 313 prior to it obtaining the required sub-resource(s). Therefore, there is a short retrieval delay 388 that arises between the CDN/CN 313 receiving the user's sub-resource request 320 and the CDN/CN 313 being able to transmit the required sub-resource(s) 322 to the user.

Figure 8:
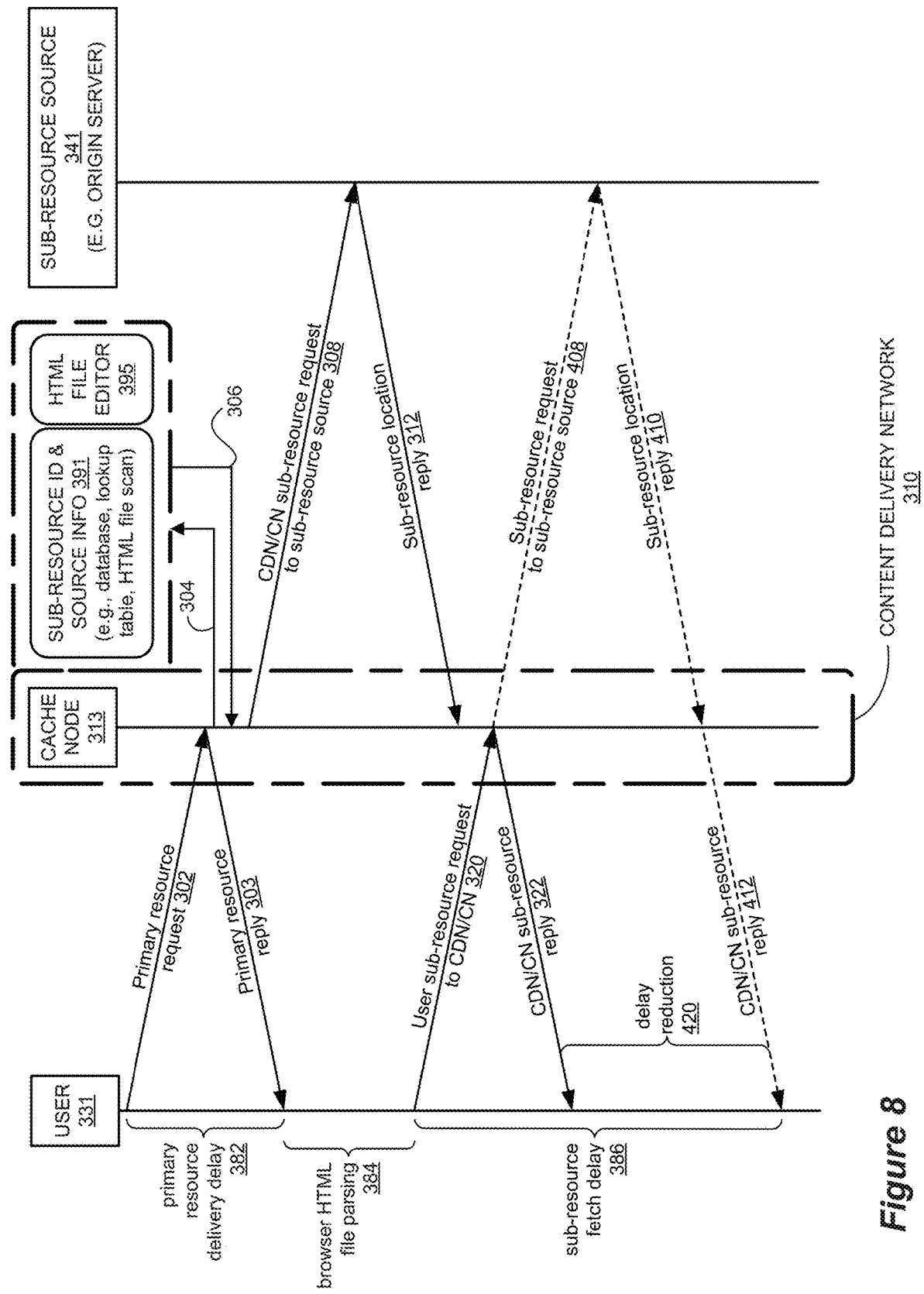
FIG. 8 is a sequence diagram illustrating a comparison of multiple methods of operating a communication system.

In each of the scenarios of FIGS. 7A-7C, the method of operation nevertheless renders a technical effect of speeding up sub-resource delivery that thus expedites web page and other primary resource processing, parsing and rendering, thus saving time when compared to earlier systems. FIG. 8 illustrates a comparison between the expedited sub-resource loading implementation(s) of FIG. 7B and cases in which no expedited sub-resource loading, pre-fetching and/or pre-loading is implemented. The operations of FIG. 7B remain the same as discussed above. In earlier situations where sub-resource pre-fetching was not utilized (operational steps 408, 410 and 412 of which are illustrated in FIG. 8 in dashed lines), additional delay was experienced by the end user device 331. As seen in FIG. 8, instead of "proactive" pre-fetching or pre-loading the required sub-resource(s), CDN/CN 313 does not take action with regard to sub-resource retrieval and loading until it receives the sub-resource request 320 from user 331. After receiving request 320, CDN/CN 313 then sends its own "reactive" sub-resource request 408 to sub-resource location 341. The requested sub-resource(s) can be transmitted to CDN/CN 313 via communication 410. Once CDN/CN 313 has received that, CDN/CN 313 can then transmit the required sub-resource(s) to user 331 via communication 412. The time saved using expedited sub-resource loading according to one or more implementations disclosed herein is represented by the delay reduction 420 in FIG. 8.

Figure 9:
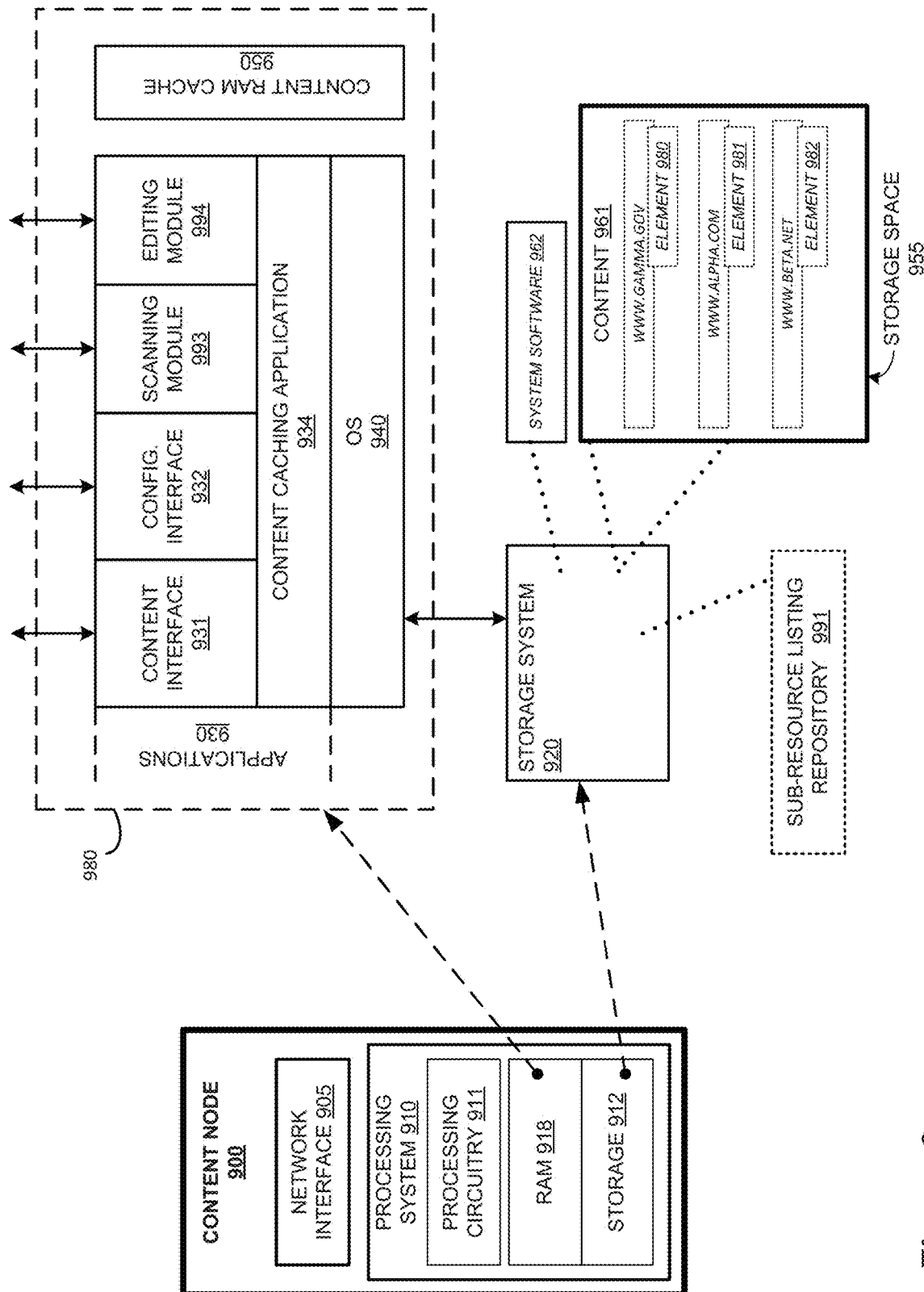
FIG. 9 illustrates a cache node.

To further describe the equipment and operation of a cache node, FIG. 9 is provided which illustrates cache node 900. Cache node 900 can be an example of cache nodes 111-113 of FIGS. 1, 3 and 5A, although variations are possible. Cache node 900 includes network interface 905 and processing system 910. Processing system 910 includes processing circuitry 911, random access memory (RAM) 918, and storage 912, although further elements can be included. Exemplary contents of RAM 918 are further detailed in RAM space 980, and exemplary contents of storage 912 are further detailed in storage system 990.

Processing circuitry 911 can be implemented within a single processing device but can also be distributed across multiple processing devices or sub-systems that cooperate in executing program instructions. Examples of processing circuitry 911 include general purpose central processing units, microprocessors, application specific processors, and logic devices, as well as any other type of processing device. In some examples, processing circuitry 911 includes physically distributed processing devices, such as cloud computing systems.

Network interface 905 includes one or more network interfaces for communicating over communication networks, such as packet networks, the Internet, and the like. The network interfaces can include one or more local or wide area network communication interfaces which can communicate over Ethernet or Internet protocol (IP) links. Network interface 905 can include network interfaces configured to communicate using one or more network addresses, which can be associated with different network links. Examples of network interface 905 include network interface card equipment, transceivers, modems, and other communication circuitry.

RAM 918 and storage 912 together can comprise a non-transitory data storage system, although variations are possible. RAM 918 and storage 912 can each comprise any storage media readable by processing circuitry 911 and capable of storing software. RAM 918 can include volatile and nonvolatile, removable and non-removable media implemented in any method or technology for storage of information, such as computer readable instructions, data structures, program modules, or other data. Storage 912 can include non-volatile storage media, such as solid state storage media, flash memory, phase change memory, magnetic memory, or as illustrated by storage system 920 in this example. RAM 918 and storage 912 can each be implemented as a single storage device but can also be implemented across multiple storage devices or sub-systems. RAM 918 and storage 912 can each comprise additional elements, such as controllers, capable of communicating with processing circuitry 911. In some implementations, the storage media can be a non-transitory storage media. In some implementations, at least a portion of the storage media can be transitory. It should be understood that in no case are the storage media propagated signals.

Software stored on or in RAM 918 or storage 912 can comprise computer program instructions, firmware, or some other form of machine-readable processing instructions having processes that, when executed by a processing system, direct cache node 900 to operate as described herein. For example, software drives cache node 900 to receive requests for content, determine if the content is stored in cache node 900, retrieve content from origin servers, transfer content to end user devices, manage data storage systems for handling and storing the content, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 980 illustrates a detailed view of an exemplary configuration of RAM 918. It should be understood that different configurations are possible. RAM space 980 includes applications 930, operating system (OS) 940, and content RAM cache 950. Content RAM cache 950 includes RAM space for temporary storage of content, such as dynamic random access memory (DRAM).

Applications 930 include content interface 931, configuration interface 932, scanning module 993, editing module 995, and content caching application 934. Content caching application 934 handles caching of content and management of storage spaces, such as content RAM cache 950 and storage space 955, as well as exchanges content, data, and instructions via content interface 931, configuration interface 932, scanning module 993, and editing module 995. Content caching application 934 can comprise a custom application, Varnish caching software, hypertext transfer protocol (HTTP) accelerator software, or other content caching and storage applications, including variations, modifications, and improvements thereof. Applications 930 and OS 940 can reside in RAM space 980 during execution and operation of cache node 900, and can reside in system software storage space 962 on storage system 920 during a powered-off state, among other locations and states. Applications 930 and OS 940 can be loaded into RAM space 980 during a startup or boot procedure as described for computer operating systems and applications.

Content interface 931, configuration interface 932, scanning module 993, and editing module 995 each allow interaction between and exchange of data with content caching application 934. In some examples, each of content interface 931, configuration interface 932, scanning module 993, and editing module 995 comprise an application programming interface (API). Content interface 931 allows for exchanging content for caching in cache node 900 by content caching application 934, and can also receive instructions to purge or erase data from cache node 900. Content interface 931 can retrieve tracking elements as well as network and web page content from origin servers for delivery to end users. Configuration interface 932 allows for altering the configuration of various operational features of content caching application 934. In some examples, configuration interface 932 comprises a scripting language interface, such as Varnish Configuration Language (VCL), Perl, PHP, JavaScript, or other scripting or interpreted language-based interfaces.

Scanning module 993 (like scanner 193 of FIGS. 3 and 5A) is configured to scan HTML files and other primary resources prior to their being sent to end user devices for inventorying JavaScript code and other sub-resources called for in such HTML files and the like. Editing module 995 (like editor 195 of FIG. 5A) is configured to edit HTML files and other primary resources prior to their being sent to end user devices for advancing an HTML file reference to JavaScript code or another sub-resource to a higher position in the HTML file body.

Content interface 931, configuration interface 932, scanning module 993, and editing module 995 can each communicate with external systems via network interface 905 over any associated network links. In further examples, one or more of elements 931, 932, 993, 995 are implemented in VCL or VCL modules.

Storage system 920 illustrates a detailed view of an exemplary configuration of storage 912. Storage system 920 can comprise flash memory such as NAND flash or NOR flash memory, phase change memory, magnetic memory, among other solid state storage technologies. As shown in FIG. 9, storage system 920 includes system software 962, as well as content 961 stored in storage space 955. As described above, system software 962 can be a non-volatile storage space for applications 930 and OS 940 during a powered-down state of cache node 900, among other operating software. Content 961 includes cached content, such as the web content examples in FIGS. 1, 3 and 5A, which can include text, data, pictures, video, audio, web pages, scripting, code, dynamic content, or other network content. Content 961 can also include tracking elements, such as transparent GIFs, web bugs, JavaScript tracking elements, among other tracking elements. In this example, content 961 includes network content and web pages associated with one or more websites, as indicated by www.gamma.gov, www.alpha.com, and www.beta.net, along with associated tracking elements 980-982.

In implementations where a cache node consults a database, lookup table, historical data or the like to identify and locate JavaScript code and other sub-resources, as noted above with regard to FIG. 1, a repository of such information can be used. Storage system 920 can also include a sub-resource listing repository 991 (similar to repository 191 of FIG. 1), which can be updated via historical data collected by cache node 900 and/or from other sources of information via network interface 905.

Cache node 900 is generally intended to represent a computing system with which at least software 930 and 940 are deployed and executed in order to render or otherwise implement the operations described herein. However, cache node 900 can also represent any computing system on which at least software 930 and 940 can be staged and from where software 930 and 940 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a cache node that caches content for delivery to multiple, different end user devices, the method comprising:
   receiving, at the cache node, a content request comprising a URL corresponding to a web page corresponding to an original HTML file, from an end user device of the multiple, different end user devices;
   consulting a repository within the cache node to identify a first JavaScript code that is required for rendering the requested web page and obtain identification and location information for the first JavaScript code,
   wherein the repository maintains a listing of JavaScript codes that have been historically requested for the URL corresponding to the web page by a plurality of the multiple different end users;
   identifying a required sub-resource by scanning the original HTML file to identify a reference to the required sub-resource;
   obtaining the first JavaScript code and the required sub-resource; and
   sending the identified original HTML file, the first JavaScript code and the required sub-resource to the end user device,
   wherein the original HTML file is used by the end user device to display the web page.

2. The method of claim 1 further comprising
receiving a request for the identified sub-resource from the end user device after sending the identified sub-resource to the end user device.

3. The method of claim 1 further comprising, prior to receiving the content request,
caching the web page in the cache node.

4. A computer apparatus, comprising:
a processor; and
a memory;
wherein the computer apparatus is configured to operate a cache node in a content delivery network, the computer apparatus further comprising processing instructions that direct the cache node, when executed by the cache node, to:
receive a content request from an end user device of a group of multiple, different end user devices served by the cache node, comprising a URL corresponding to a web page;
identify an primary resource corresponding to the requested web page,
wherein the primary resource comprises a primary resource file body;
consult a repository within the cache node to identify a first JavaScript code required for rendering the requested web page and obtain identification and location information for the first JavaScript code
wherein the repository maintains a listing of JavaScript codes that have been historically requested for the URL corresponding to the web page by a plurality of the group of multiple, different end user devices;
identify a required sub-resource by scanning the original HTML file to identify a reference to the required sub-resource;
obtain the first JavaScript code and the required sub-resource; and
send the identified original HTML file, the first JavaScript code and the required sub-resource to the end user device, wherein the original HTML file is used by the end user device to display the web page.

5. A cache node that caches content for delivery to multiple,
different end user devices, the cache node comprising:
a storage system configured to cache web page content comprising an original HTML file corresponding to a web page, wherein the original HTML file comprises an HTML file body including a reference to a first JavaScript code that is required for rendering the web page;
a repository that maintains a listing of JavaScript codes that have been historically requested for a URL corresponding to the web page by a plurality of the multiple, different end user devices;
responsive to a content request from an end user device for the web page, a network interface and processing circuitry configured to:
receive the content request from the end user device;
identify the first JavaScript code that is required for rendering the web page by consulting the repository;
identify a required sub-resource by scanning the original HTML file to identify a reference to the required sub-resource;
obtain the first JavaScript code and the required sub-resource;
send the identified original HTML file, the first JavaScript code and the required sub-resource to the end user, wherein the original HTML file is used by the end user device to display the web page.

6. The cache node of claim 5 wherein the processing circuitry is further configured to receive a request for the JavaScript code from the end user device prior to the cache node sending the JavaScript code to the end user device.

* * * * *